United States Patent
Arnold et al.

(10) Patent No.: US 7,516,752 B2
(45) Date of Patent: Apr. 14, 2009

(54) BOIL-OFF COMPENSATING CRYOADSORPTION CONTAINER FOR LIQUID GAS STORAGE

(75) Inventors: Gerd Arnold, Nauheim (DE); Ulrich Eberle, Mainz (DE)

(73) Assignee: General Motors Corporation, Detroit, MI (US)

(*) Notice: Subject to any disclaimer, the term of this patent is extended or adjusted under 35 U.S.C. 154(b) by 949 days.

(21) Appl. No.: 11/069,190

(22) Filed: Mar. 1, 2005

(65) Prior Publication Data

US 2006/0199064 A1 Sep. 7, 2006

(51) Int. Cl.
F17C 1/00 (2006.01)
F17C 7/04 (2006.01)

(52) U.S. Cl. .................. 137/264; 220/560.1; 62/48.1; 62/50.1

(58) Field of Classification Search .............. 137/264, 137/255, 899, 351; 220/560.1, 560.11, 562; 62/45.1, 48.1, 48.2, 50.1
See application file for complete search history.

(56) References Cited

U.S. PATENT DOCUMENTS

| | | | |
|---|---|---|---|
| 2,035,396 A | 3/1936 | Mesinger | |
| 5,839,285 A * | 11/1998 | Kniebes | 62/48.1 |
| 6,640,554 B2 * | 11/2003 | Emmer et al. | 62/45.1 |

FOREIGN PATENT DOCUMENTS

| | | |
|---|---|---|
| DE | 2757019 A1 | 7/1978 |
| DE | 10021681 C2 | 11/2001 |
| DE | 10232522 A1 | 4/2004 |
| GB | 1427492 | 3/1976 |
| WO | WO 03/064030 A1 | 8/2003 |

* cited by examiner

Primary Examiner—Kevin L Lee

(57) ABSTRACT

A hydrogen-based propulsion system is provided for storing hydrogen feed gas which evaporates over time from a storage vessel containing liquid hydrogen as a fuel. In particular, this system enables the evaporated hydrogen feed gas to be stored for later use in the propulsion unit and also provides a system for enabling the stored hydrogen gas to be cooled by evaporated hydrogen feed gas in transit to the propulsion unit.

12 Claims, 2 Drawing Sheets

BOIL-OFF COMPENSATING CRYOADSORPTION CONTAINER FOR LIQUID GAS STORAGE

FIELD OF THE INVENTION

The present invention relates to hydrogen-based propulsion systems and, more particularly, to a boil-off compensating cyroadsorption container for liquid gas storage.

BACKGROUND OF THE INVENTION

Hydrogen-based propulsion systems may comprise either a fuel cell or an internal combustion engine, for example. Fuel cell systems generally include a fuel cell stack that produces electrical energy based on a reaction between a hydrogen feed gas and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein.

Hydrogen-based Internal Combustion Engines (ICE) generally include an engine that produces mechanical energy based on the combustion process of hydrogen. The hydrogen-based feed gas is supplied to the ICE at appropriate operating conditions (i.e., temperature and pressure) for being combusted.

In a typical hydrogen-based propulsion application, two types of conventional hydrogen storage may be considered—compressed hydrogen and liquid hydrogen. The storage of liquid hydrogen requires complex, multi-layer, vacuum super isolated (insulated) tanks due to the low storage temperature of liquid hydrogen (approximately 20 degrees Kelvin or –424 Fahrenheit). Over the operation of the vehicle, however, heat will generally penetrate the storage container, causing the temperature of the liquid hydrogen to rise, resulting in the evaporation of the liquid hydrogen. Currently, this evaporated hydrogen vapor is captured and reacted with air to create water before being exhausted or diluted and thereinafter exhausted. This results in a loss of hydrogen which could be used as a feed gas. Accordingly, a need exists for a system able to recapture this hydrogen feed gas.

SUMMARY OF THE INVENTION

The present invention provides a propulsion system including a fuel cell stack or an ICE operable for receipt -of a fluid to generate electrical or mechanical energy. A storage tank is operable to receive the fluid in a first phase and a purge container in communication with the storage tank and the fuel cell stack or the ICE is operable to receive the fluid in a second phase. A valve in communication with the storage tank is operable to enable the purge container to be bypassed for certain operation conditions (e.g., the de-fueling of the purge container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses. Although the following exemplary description refers to the use of a propulsion system in a vehicle, it will be understood that the present invention may be applicable to other types of energy generation devices for use in many other types of equipment. It will be further understood that hereinafter a fuel cell system will be used as an example for such a hydrogen-based propulsion system, but the invention may be applicable to numerous other feed gases and energy converters (not only for vehicular applications), as well, including internal combustion engines.

Figure 1:
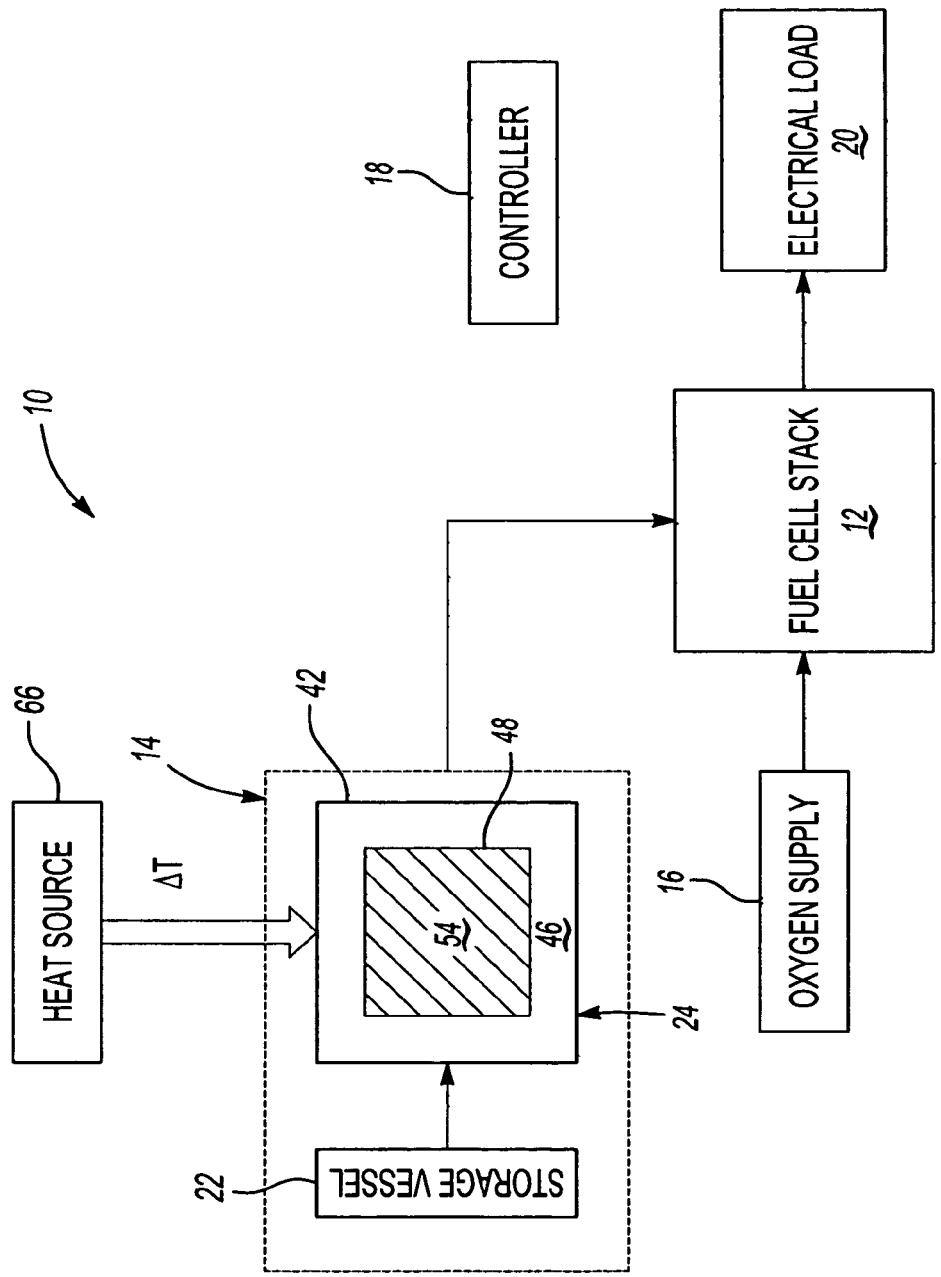
FIG. 1 is a schematic illustration of a propulsion system including a boil-off compensating cyroadsorption chamber according to the present invention.

Referring now to FIG. 1, a fuel cell system 10 is shown. The fuel cell system 10 includes a fuel cell stack 12 coupled to a hydrogen supply unit 14, an oxygen supply unit 16, and a controller 18. The fuel cell stack 12 produces electrical power to power an electrical load 20. The electrical load(s) 20 can include an electric motor, lights, heaters or any other type of electrically powered components.

With continuing reference to FIG. 1 and additional reference to FIG. 2, the hydrogen supply unit 14 supplies hydrogen or reactant to the fuel cell stack 12. The hydrogen supply unit 14 includes a storage vessel 22 in fluid communication with a boil-off compensating cyroadsorption chamber or purge container 24. The purge container 24 provides the hydrogen feed gas to the fuel cell stack 12.

The storage vessel 22 includes an inlet 26 for receipt of the hydrogen in liquid form. The storage vessel 22 is illustrated as cylindrical, however, any other design may be used. The storage vessel 22 may be manufactured from any material which is able to insulate liquid hydrogen feed gas from the atmosphere, and may-comprise a multi-layer vacuum super insulated tank. The storage-vessel 22 is generally of the type which enables the liquid hydrogen feed gas to remain at approximately 20 Kelvin (–424 degrees Fahrenheit) for a period of time. The storage vessel 22 further includes an elevated pipe 28 for receipt of vaporous or evaporated hydrogen from the storage vessel 22.

The elevated pipe 28 is to facilitate the removal of the evaporated hydrogen, however, any suitable geometric configuration could be employed. The elevated pipe 28 has a first branch 30, a second branch 32 and a third branch 34 (shown in FIG. 2). The first branch 30 and second branch 32 of the pipe 28 are each coupled to the purge container 24 to provide the purge container 24 with the evaporated hydrogen. More specifically, a first valve 36 in communication with the controller 18 is disposed in the first branch 30 and a second valve 38 in communication with the controller 18 is disposed in the second branch 32. The first and second valves 36, 38 serve to regulate the flow of the hydrogen gas through the purge container 24. A bypass valve 40 (also connected to the controller) is disposed in the third branch 34 for certain operation conditions (e.g., to enable the purge container 24 to be de-fueled, as will be discussed in greater detail below).

In contrast, in liquid hydrogen storage systems, a second mode of operation includes the extraction of liquid hydrogen as fuel for the propulsion system. This liquid hydrogen has to be evaporated outside of the storage vessel 22 and the resulting cold hydrogen gas may be also fed into pipe 28.

The purge container 24 includes an outer tank 42 having an inlet 44 coupled to the first branch 30 of the elevated pipe 28 of the storage vessel 22 for receipt of the cold gaseous hydrogen. More specifically, the outer tank 42 includes a passage 46 coupled to the inlet 44 to direct the evaporated hydrogen around an inner tank 48 disposed within the outer tank 42. By enabling the evaporated hydrogen to flow through the inlet 44 of the outer tank 42, the evaporated hydrogen acts as an active insulating shield to protect the inner tank 48 from external heat. Although both the inner tank 48 and outer tank 42 are illustrated as being rectangular in shape, it shall be understood that other more complex configurations are within the scope of this invention. The inner tank 48 can be suspended within the outer tank 42 via any appropriate means, such as, for example, welded bars, fasteners, or rods. The outer tank 42 may be a multi-layer super insulated vacuum tank or an evacuated powder insulation, however, any other appropriate type of container capable of insulating hydrogen or other gases at low temperatures could be employed. The outer tank 42 also includes an outlet 50 fluidly coupled to the fuel cell stack 12 for transmitting the evaporated hydrogen out of the passage 46.

The inner tank 48 includes an inlet 52 fluidly coupled to the second branch 32 of the elevated pipe 28. The inner tank 48 is filled with a high surface material 54, such as, for example, super-activated carbon, zeolites or any other compounds, such as, for example, metal-organic compounds, which are capable at low pressures and low temperatures of absorbing sufficient amounts of hydrogen (compared to a conventional compressed hydrogen tank system). The inner tank further includes an outlet 56 fluidly coupled to the fuel cell stack 12 and having a third valve 58 to enable unabsorbed hydrogen to flow to the fuel cell stack 12-as will be discussed in greater detail below.

Figure 2A:
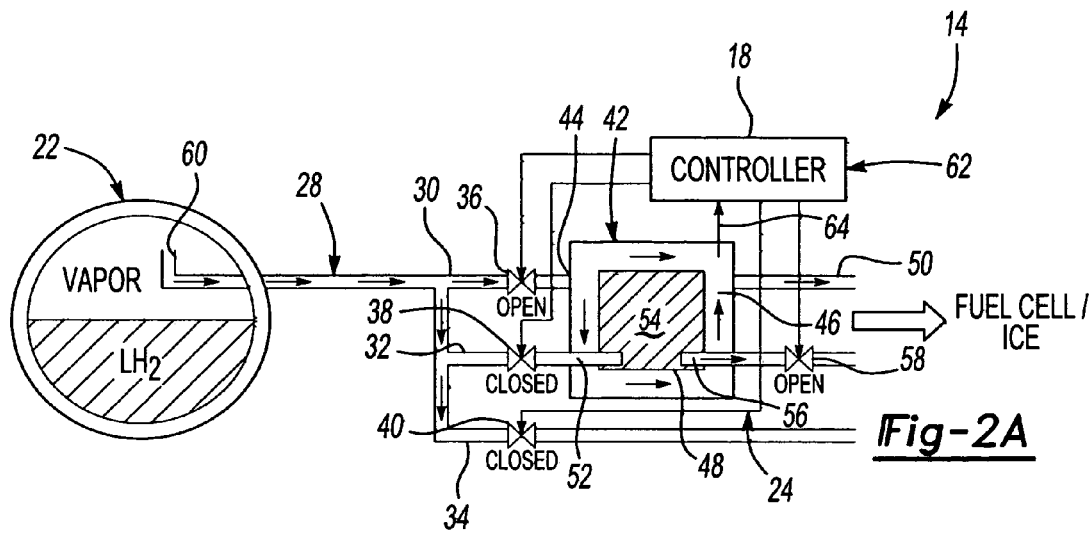
FIG. 2a is a detailed illustration of the boil-off compensating cryoadsorption chamber of FIG. 1 when the fuel cell system is operating normally.

The controller 18 is coupled to the first, second and third valves 36, 38, 58 and the bypass valve 40. More specifically, the controller 18 will either open or close the first valve 36, second valve 38, third valve 58 and bypass valve 40 depending upon a signal received from a sensor 60 which indicates the amount of evaporate hydrogen entering into the elevated pipe 28. Based upon the input from the sensor 60, and an input 62 from the fuel cell stack 12, the controller 18 will open the first valve 36 and third valve 58, leaving the second valve 38 and bypass valve 40 closed, to enable the greatest amount of hydrogen to flow into the fuel cell stack 12. In particular, when the hydrogen supply unit 14 is in a normal operating-state and the fuel cell stack 12 is generating electricity, the controller 18 will open the first valve 36 and enable the evaporated hydrogen to enter the outer tank 42 to eventually flow to the fuel cell stack 12 (as shown in FIG. 2A). The controller 18 will also open the third valve 58 to enable the hydrogen within the inner tank 48 to exit into the fuel cell stack 12. During normal operation of the hydrogen supply unit 14, the purge container 24 should be nearly empty.

Figure 2B:
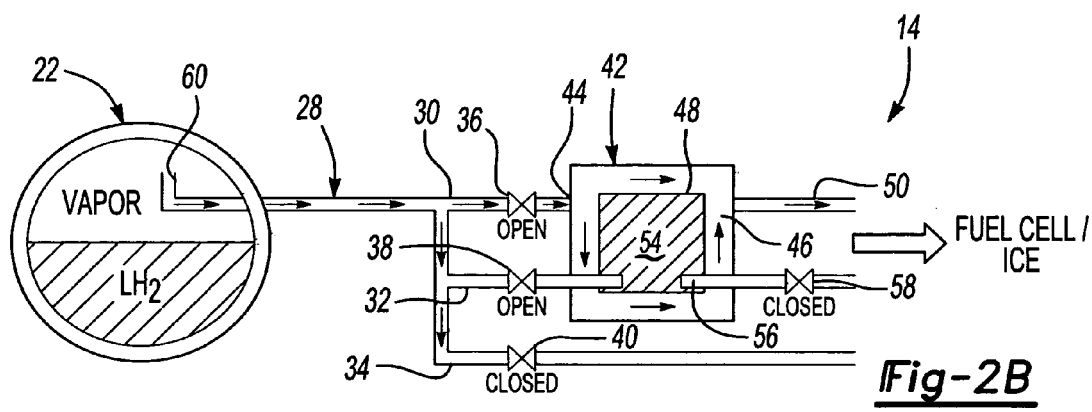
FIG. 2b is a detailed illustration of the boil-off compensating cryoadsorption chamber of FIG. 1 in a boil-off condition.

Next, when the sensor 60 and the input 62 from the fuel cell stack 12 indicate a boil-off condition, or any condition wherein there is excess evaporated hydrogen which cannot be used immediately in the fuel cell stack 12, the controller 18 will divert some of the evaporated hydrogen from the outer tank 42 to the inner tank 48 for storage (as shown in FIG. 2B). Specifically, the controller 18 will open the second valve 38 and close the third valve 58 while the first valve 36 remains open to enable a portion of the evaporated hydrogen to enter the inner tank 48 for absorption by the high surface material 54. Thus, the excess hydrogen is stored for later use and continuously cooled via the evaporated hydrogen which flows around the inner tank 48 through the outer tank 42 prior to entering the fuel cell stack 12.

Figure 2C:
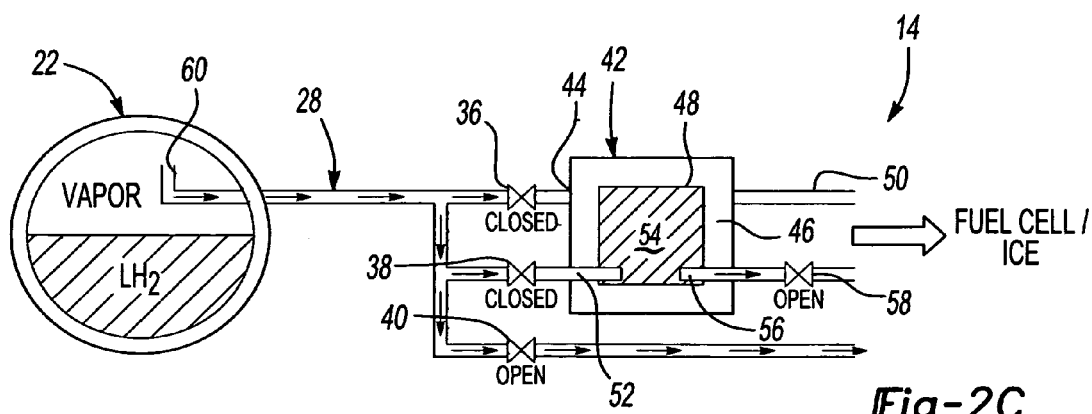
FIG. 2c is a detailed illustration of the boil-off compensating cryoadsorption chamber of FIG. 1 in during de-fueling.

If the high surface material 54 becomes saturated, a second sensor 64 in communication with the controller 18 will signal the controller 18 to close the second valve 38, which causes the hydrogen flow to be diverted into the branches 30 and/or 34. If the operating conditions of the hydrogen supply unit 14 return to standard operation, the hydrogen is stored in the high surface material 54. In order to de-fuel the purge container 24 and remove the absorbed hydrogen, the controller 18 closes both the first and second valves 36, 38 while opening the third valve 58 and the bypass valve 40 (as shown in FIG. 2C). Thus, the evaporated hydrogen cannot enter the purge container 24, but rather it flows into a chamber (not shown) to be reacted with air to create water which may then be released into the atmosphere. The diversion of the evaporated hydrogen from the purge container 24 will generally result in an increase in temperature in the purge container 24 (due to unavoidable heat input), which will in turn cause the high surface material 54 to release or desorb the hydrogen. The desorbed hydrogen can then exit the purge container 24 through the third valve 58 where it can be used in the fuel cell stack 12. If the increase in temperature which results from the diversion of the evaporated hydrogen from the purge container 24 is not sufficient to empty the purge container 24, the temperature in the purge container 24 may also be increased through the use of a separate source 66, such as, for example, an active electric heater or heated fluid from the drivetrain of the vehicle may be routed and/or valved (not specifically shown) as such to provide heat to the area surrounding the purge container 24 when de-fueling is required. Hydrogen may also be released from the high-surface material by a pressure relief in the purge container 24, such as a pump (not shown). The above mentioned methods of hydrogen release may also be combined, if desired.

The present invention greatly improves the efficiency of the hydrogen supply system by capturing evaporated hydrogen for later use in the fuel cell stack 12. This recapture of the evaporated hydrogen reduces expenses for the operator of the vehicle by increasing fuel economy. In addition, the use of the evaporated hydrogen to cool the inner tank 48 reduces the cost and complexity of the hydrogen supply unit 14 by reducing the amount of insulation required to maintain the proper temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydrogen supply system for a fuel cell, comprising:
a liquid hydrogen storage tank;
a purge container in communication with the liquid hydrogen storage tank, said purge container comprising an outer tank in communication with said liquid hydrogen storage tank and an inner tank disposed within said outer tank and in communication with said liquid hydrogen storage tank, each of said inner and outer tanks of said purge container having an outlet passage.

2. The system of claim 1, wherein the inner tank is disposed within the first tank to enable the fluid in the outer tank to surround the second tank.

3. The system of claim 2, further comprising:
- a controller operable to generate a signal based upon input from at least one sensor;
- a first valve in communication with the outer tank, the first valve operable by the controller to enable the outer tank to receive hydrogen vapor from said liquid hydrogen storage tank; and
- a second valve in communication with the inner tank, the second valve operable to enable the inner tank to receive said hydrogen vapor from said liquid storage tank.

4. The system of claim 3, wherein said controller is in communication with a bypass valve disposed in a bypass passage that communicates with said liquid hydrogen storage tank and not said purge container, and said controller is operable to cause the bypass valve to open.

5. The system of claim 4, wherein the purge container further comprises a source of thermal energy to heat the purge container in response to a control signal from said controller.

6. The system of claim 1, wherein said inner tank of said purge container further comprises a material selected from the group consisting of high surface materials such as super-activated carbon, zeolites, metal-organic compounds or combinations thereof.

7. A hydrogen-based propulsion system for a vehicle, the propulsion system comprising:
- a propulsion unit operable to provide energy to the vehicle; and
- a hydrogen supply system connected to said propulsion unit and including a liquid hydrogen storage tank and a purge container in communication with the liquid hydrogen storage tank, said purge container comprising an outer tank in communication with said liquid hydrogen storage tank and an inner tank disposed within said outer tank and in communication with said liquid hydrogen storage tank, each of said inner and outer tanks of said purge container having an outlet passage connected to said propulsion unit.

8. The system of claim 7, wherein said inner tank is disposed within said outer tank to enable a reactant in the outer tank to surround the inner tank.

9. The system of claim 8, further comprising:
- a controller operable to generate a signal based upon input from at least one sensor;
- a first valve in communication with the outer tank, the first valve operable by the controller to enable the outer tank to receive hydrogen vapor from said liquid hydrogen storage tank; and
- a second valve in communication with the inner tank, the second valve operable to enable the inner tank to receive said hydrogen vapor from said liquid storage tank.

10. The system of claim 9, wherein said controller is in communication with a bypass valve disposed in a bypass passage that communicates with said liquid hydrogen storage tank and not said purge container, and said controller is operable to cause the bypass valve to open.

11. The system of claim 10, wherein the purge container further comprises a source of thermal energy to heat the purge container in response to a control signal from said controller.

12. The system of claim 11, wherein said inner tank of said purge container further comprises a material selected from the group consisting of high surface materials such as super-activated carbon, zeolithe, metal-organic compounds or combinations thereof.

* * * * *